US007015932B1

(12) United States Patent
Koike et al.

(10) Patent No.: US 7,015,932 B1
(45) Date of Patent: Mar. 21, 2006

(54) SYSTEM FOR DESIGNING VISUAL INFORMATION TO BE DISPLAYED ON MONITOR UNIT USED IN COMBINATION WITH PROGRAMMABLE CONTROLLER

(75) Inventors: Sadamitsu Koike, Hirakata (JP); Masato Nanboku, Hirakata (JP); Eiichi Uematsu, Neyagawa (JP); Toshiaki Yoshiyasu, Hirakata (JP); Koji Ono, Katano (JP); Kyosuke Iribe, Hirakata (JP); Hiroshi Okada, Yawata (JP); Yoshiharu Yoshimoto, Hirakata (JP); Teruma Nishi, Hirakata (JP)

(73) Assignee: Matsushita Electric Works, Ltd., Kadoma (JP)

( * ) Notice: Subject to any disclaimer, the term of this patent is extended or adjusted under 35 U.S.C. 154(b) by 504 days.

(21) Appl. No.: 10/089,106

(22) PCT Filed: Sep. 28, 2000

(86) PCT No.: PCT/JP00/06712

§ 371 (c)(1), (2), (4) Date: Mar. 26, 2002

(87) PCT Pub. No.: WO01/23970

PCT Pub. Date: Apr. 5, 2001

(30) Foreign Application Priority Data

Sep. 30, 1999 (JP) ................................ 11/280787

(51) Int. Cl.
*G06T 11/00* (2006.01)

(52) U.S. Cl. ....................................... 345/619; 345/1.1

(58) Field of Classification Search ................ 345/419, 345/619, 629, 636, 641, 467, 471, 702, 703, 345/780, 783, 817, 173, 520, 531; 717/104–109
See application file for complete search history.

(56) References Cited

U.S. PATENT DOCUMENTS

| | | | | |
|---|---|---|---|---|
| 4,763,356 | A | 8/1988 | Day, Jr. et al. | |
| 6,026,336 | A * | 2/2000 | Sakurai et al. | 700/86 |
| 6,378,221 | B1 * | 4/2002 | Ekholm et al. | 33/551 |

FOREIGN PATENT DOCUMENTS

EP 0 575 147 12/1993

(Continued)

OTHER PUBLICATIONS

Maple Systems, Inc. Apr. 27, 1999. http://web.archive.org/web/19990427117318/http://www.maple-systems.com/.*

(Continued)

*Primary Examiner*—Ulka J. Chauhan
*Assistant Examiner*—Peter-Anthony Pappas
(74) *Attorney, Agent, or Firm*—Oblon, Spivak, McClelland, Maier & Neustadt, P.C.

(57) ABSTRACT

A system for designing visual information on a monitor unit which enables the use of the monitor unit manufactured at a reduced cost but assures rapid reproduction of the intended visual information. The monitor unit is utilized in combination with a programmable logic controller (PLC) for monitoring a task to be performed by I/O devices managed by the PLC. The monitor unit includes a display, a controller section, and a memory. The system includes an image design tool operating on a personal computer for creating a source display code of the visual information to be reproduced on the display. The image design tool has a conversion means which translates the source display code into a corresponding bitmapped image and exports the bitmapped image to the monitor unit for immediate reproduction of the visual information on the display. Consequently, the monitor unit can be dispensed with a costly component of translating the source image code into the bitmapped image, yet effecting rapid reproduction of the visual information on the display directly from the bitmapped image transferred from the image design tool.

7 Claims, 5 Drawing Sheets

FOREIGN PATENT DOCUMENTS

| | | |
|---|---|---|
| EP | 0 834 801 | 4/1998 |
| JP | 7-55968 | 3/1995 |
| JP | 8-44409 | 2/1996 |
| JP | 8-156363 | 6/1996 |
| JP | 8-166785 | 6/1996 |
| JP | 9-207393 | 8/1997 |
| JP | 10-340109 | 12/1998 |

OTHER PUBLICATIONS

Maple Systems, Inc. Feb. 29, 2000. http://web.archive.org/web/20000229123057/http://www.maple-systems.com/.*

L. Cockrell, et al., Cement Industry Technical Conference, pp. 65-98, XP-010050523, "Selecting a Man/Machine Interface for a PLC Based Process Control System", May 21, 1991 (p. 66 will be filed later).

P. Collings, et al., Pulp and Paper Industry Technical Conference, pp. 1-16, XP-010140633, "Man-Machine Interfases, Trends and Needs", Jun. 12, 1995.

English Abstracts of Japan, JP 8-044409, Feb. 16, 1996.

English Abstracts of Japan, JP 10-340109, Dec. 22, 1998.

English Abstracts of Japan, JP 8-156363, Jun. 18, 1996.

English Abstracts of Japan, JP 9-207393, Aug. 12, 1997.

English Abstracts of Japan, JP 7-055968, Mar. 3, 1995.

English Abstracts of Japan, JP 8-166785, Jun. 25, 1996.

* cited by examiner

SYSTEM FOR DESIGNING VISUAL INFORMATION TO BE DISPLAYED ON MONITOR UNIT USED IN COMBINATION WITH PROGRAMMABLE CONTROLLER

FIELD OF THE INVENTION

The present invention relates to a system for designing visual information on a monitor unit utilized in combination with a programmable logic controller (PLC).

BACKGROUND ART

A monitor unit has been utilized in combination with a programmable logic controller (PLC) in order to monitor a task performed by I/O devices connected to and controlled by the PLC. The monitor unit includes a display for displaying visual information prepared for informing the task being performed, a controller section for controlling to display the visual information, and a memory for storing the visual information to be selectively reproduced on the display. In order to design the visual information, an image design tool is provided for creating a source display code of the visual information. After completing the design of the visual information on the tool, the source display code is transferred to the monitor unit where the source display code is translated into a corresponding bitmapped image for reproduction of the visual information on the display. Normally, the visual information created on the tool includes a combination of characters and graphic images. The characters are realized as vector fonts by the image design tool or draw program with the use of a font file provided on a computer running the draw program, while the graphic images are realized in a vector-oriented format defined by the program. Therefore, the monitor unit is required to have additional character ROM for translating the characters into the corresponding bitmapped image as well as to have a capability of translating the graphic images in the vector-oriented format into the corresponding bitmapped image. The more the intended visual information becomes sophisticated with the inclusion of elaborate graphic images and the characters of different font sizes, the more the monitor unit is required to have the translation capability for rapid reproduction of the visual information on the display. To meet this requirement, the prior monitor unit has to incorporate a high speed CPU and a graphic processor, and therefore is realized at a considerably high cost.

DISCLOSURE OF THE INVENTION

In view of the above insufficiency, the present invention has been achieved to provide a system for designing visual information on a monitor unit which enables the use of the monitor unit manufactured at a reduced cost but assures rapid reproduction of the intended visual information. The monitor unit is utilized in combination with a programmable logic controller (PLC) for monitoring a task to be performed by I/O devices managed by the PLC. The PLC executes a program for controlling the I/O device connected to the PLC. The monitor unit includes a display, a controller section, and a memory. The system includes an image design tool operating on a personal computer for creating a source display code of the visual information to be reproduced on the display. The characterizing feature of the present invention resides in that the image design tool has a conversion means which translates the source display code into a corresponding bitmapped image and exports the bitmapped image to the monitor unit for immediate reproduction of the visual information on the display. Consequently, the monitor unit can be dispensed with a costly component of translating the source image code into the bitmapped image, yet effecting rapid reproduction of the visual information on the display directly from the bitmapped image transferred from the image design tool.

Accordingly, it is a primary object of the present invention to provide a system for designing the visual information to be displayed on the monitor unit which allows the use of the less costly monitor unit but assures high speed reproduction of the visual information on the display.

In a preferred embodiment, the monitor unit is defined by a touch screen unit having a touch screen switch which generates a switch output to the PLC in response to a user's action of touching a particular area on the display. That is, the monitor unit, i.e., the touch screen unit is utilized in combination with the PLC also as an input terminal for entry of a specific instruction to be carried out by the PLC for control of the device managed by the PLC. In this connection, the image design tool includes a function of creating a switch control code for defining the switch output, and a transfer function of transferring the switch control code to the memory of the touch screen unit. The switch control code is processed by the controller section of the touch screen unit to associate the switch output to a particular function of the PLC for control of the devices connected to the PLC.

Preferably, the image design tool is programmed to transfer the source display code together with the bitmapped image thereof to the memory of the monitor unit. The image design tool is also programmed to have a retrieve function of retrieving the source display code as well as the switch control code back from the memory of the monitor unit for modification of the visual information and the switch control code at the image design tool. That is, all the information or data displayed or processed by the monitor unit can be backed-up within the monitor unit to be accessible by the image design tool. Therefore, the modification of the visual information as well as the switch control code can be made without having to back up the data in another system, which is another object of the present invention.

Further, the present invention provides a scheme of rapid reproduction of a graphic image defined by a rectangular frame on the display. The rectangular frame is frequently utilized to be included in the visual information for highlighting a particular message written in the visual information. The image design tool gives a screen area for drawing the visual information therein. The screen area is divided into a plurality of unit zones extending in parallel with each other with each unit zone and having a length and a unit width defined by a fixed number of dots. The image design tool includes a means of drawing the rectangular frame which is written in the source display code and is translated into a corresponding bitmapped image for reproduction on the display. The image design tool is also equipped with a reshaping means of resizing the bitmapped image of the rectangular frame into a modified rectangular frame having a width equal to an integer multiple of the unit width, dividing the modified rectangular frame into one or more segments having the unit width, and transferring the one or more segments to the memory of the monitor unit or touch screen unit so as to be recombined on the display for reproduction of the bitmapped image of the modified bitmapped rectangular frame. Thus, the controller section of the monitor unit can be easy to perform a rapid reproduction of the modified rectangular frame on the display, which is a further object of the present invention.

Preferably, the rectangular frame is defined as corresponding to a touch sensitive part of the touch screen switch for facilitating to prompt the entry of the instruction.

In a preferred embodiment, the image design tool has a capability of selecting a particular linguistic code from a set of different linguistic codes so as to create the visual information by using a string of characters according to the selected linguistic code. The tool also has a capability of including an identifier of identifying the selected linguistic code into the source display code such that, when the source display code is retrieved from the memory of the monitor unit into the image design tool, the string of the characters of the selected linguistic code is reproduced on the image design tool. Thus, the characters of any linguistic codes employed for the visual information can be successfully replicated at the image design tool without causing character garbling.

The memory of the monitor unit may be configured to include a virtual image area and an actual image area. The virtual image area has a size greater than a screen size given to the display and is provided for loading the bitmapped image to give a virtual image of the bitmapped image therein. The actual image area has a size equal to the screen size of the display and is provided for trimming the virtual image from the virtual image area into an actual image fitted in the screen size and stores the actual image. The actual image is then transferred by the CPU of the monitor unit to the display for reproduction of the visual information on the display. Thus, only the image within the screen size can be simply transferred from the memory without resorting to laborious procedure of checking over-reached portion of the image and making proportional resizing of the entire image, thereby enabling immediate reproduction of the visual information on the display.

BEST MODE FOR CARRYING OUT THE INVENTION

Figure 1:
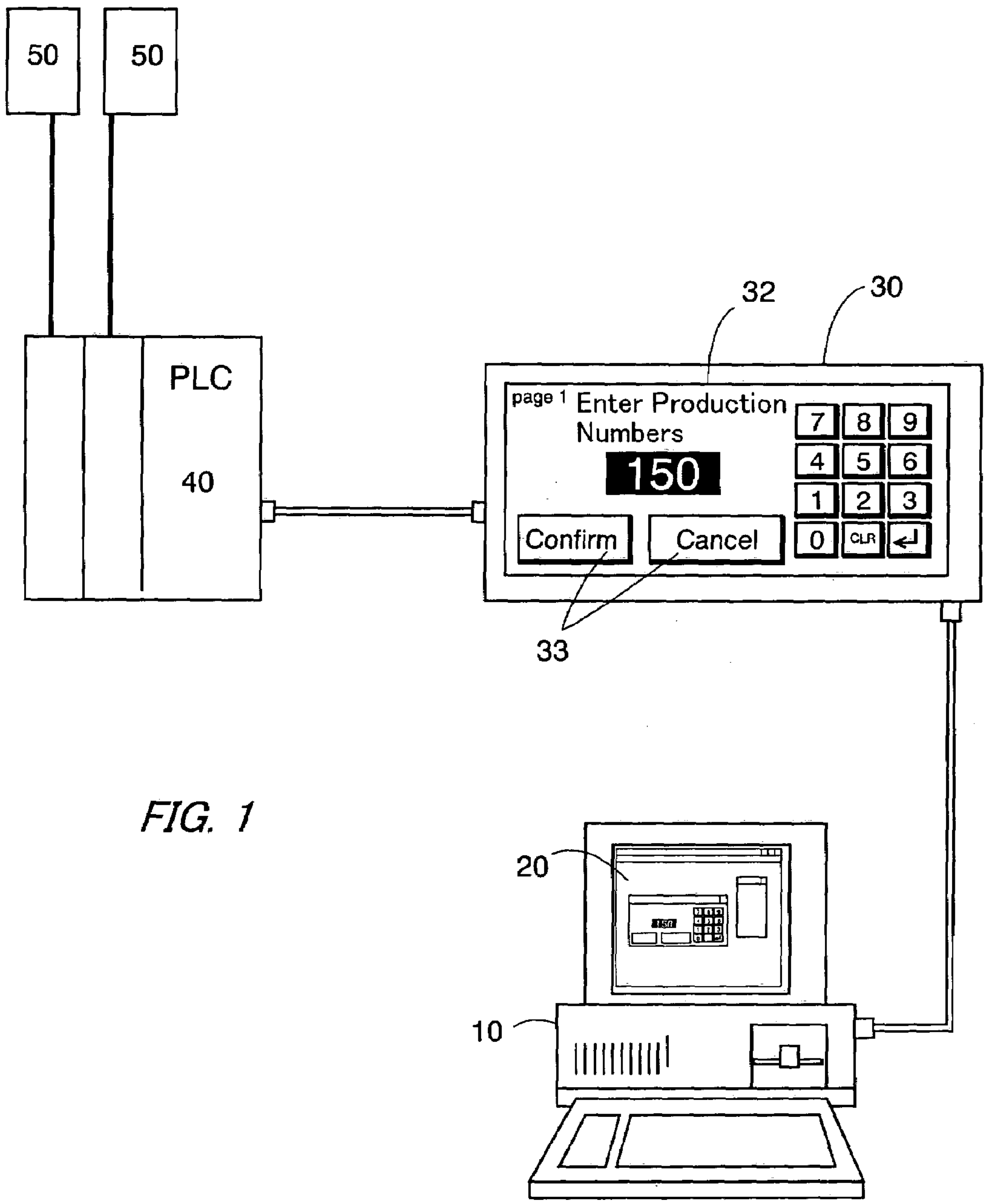
FIG. 1 shows a diagram showing a system for designing visual information on a monitor unit in accordance with a preferred embodiment of the present invention.
Figure 2A:
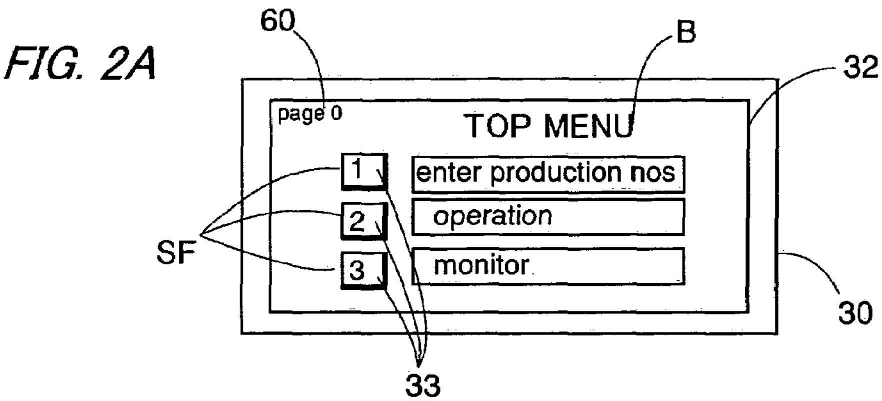
FIGS. 2A to 2D are views showing different pages displayed on the monitor unit realized by a touch screen unit.
Figure 2B:
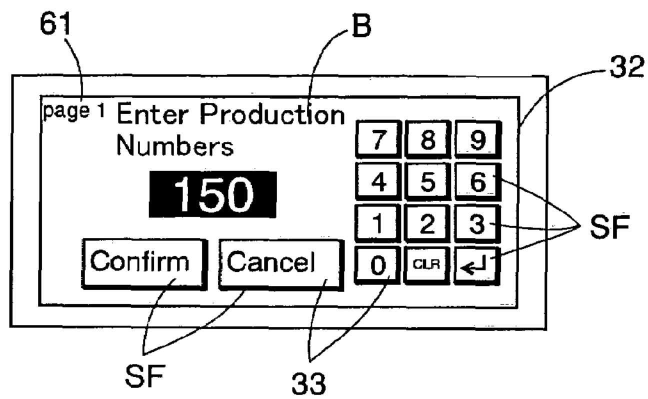
Figure 2C:
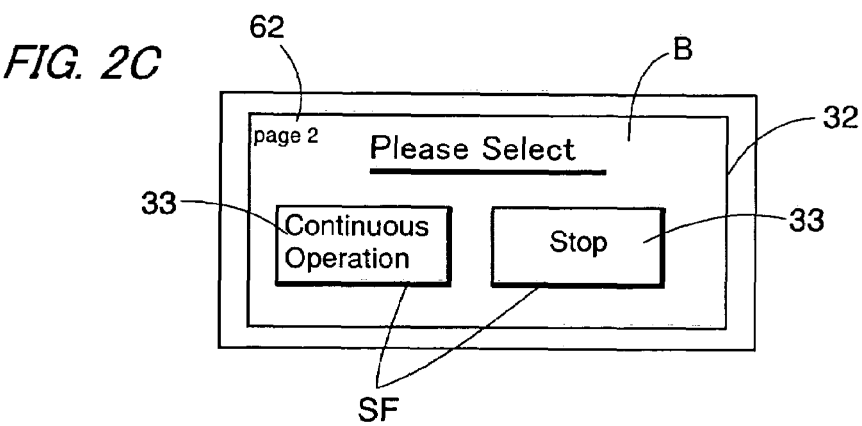
Figure 2D:
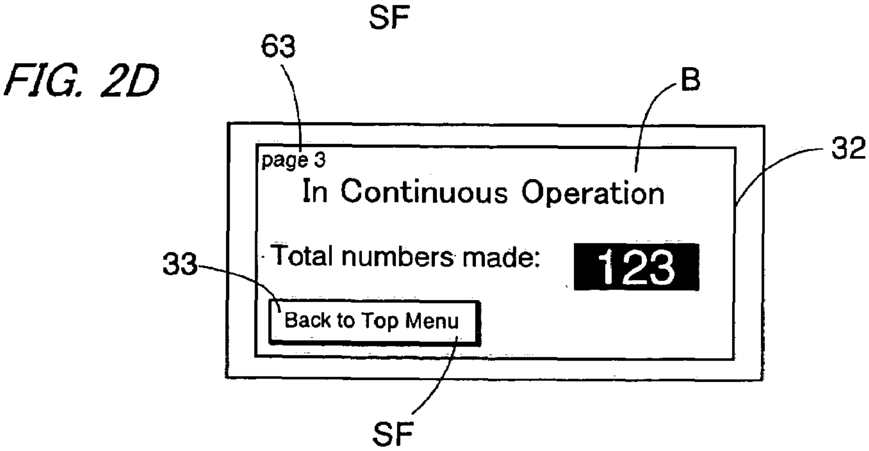

Referring now to FIG. 1, there is shown a system for designing visual information on a monitor unit 30 in accordance with the present invention. The monitor unit 30 is realized by a touch screen unit which is utilized in combination with a programmable logic controller (PLC) 40 as a monitor of displaying information of a task being performed by I/O devices 50 managed by PLC 40 and also as an input terminal for entry of specific instructions to be carried out by PLC 40 for control of I/O devices 50. PLC 40 executes its own program for control of the I/O devices 50. For easy understanding of present invention, it is illustrated in the specification and drawings that PLC 40 manages the I/O devices 50 for continuous production of parts as one typical application of PLC 40. The monitor unit 30 (hereinafter referred to as the touch screen unit) is therefore programmed to provide visual information associated with the production of the parts so that a user is informed of the status of the parts production as well as that the user is guided by the visual information to enter the specific instruction. The touch screen unit 30 includes a touch screen switch 33 (hereinafter referred to simply as touch switch) which provides switch outputs in accordance with the entry of the instructions for carrying out particular functions at PLC 40.

In order to create the visual information and switch control code which is included in the visual information for allocating the switch outputs to the particular functions at PLC 40, the system includes an image design tool 20, i.e., a draw program which runs on a personal computer 10. As shown in FIGS. 2A to 2D, the visual information to be created at the image design tool are classified into four pages, i.e., a top menu page 60, a first selected page 61 for entry of intended production numbers of the parts, a second page 62 for entry of actions, and a third page 63 for display status of the operation.

Figure 3:
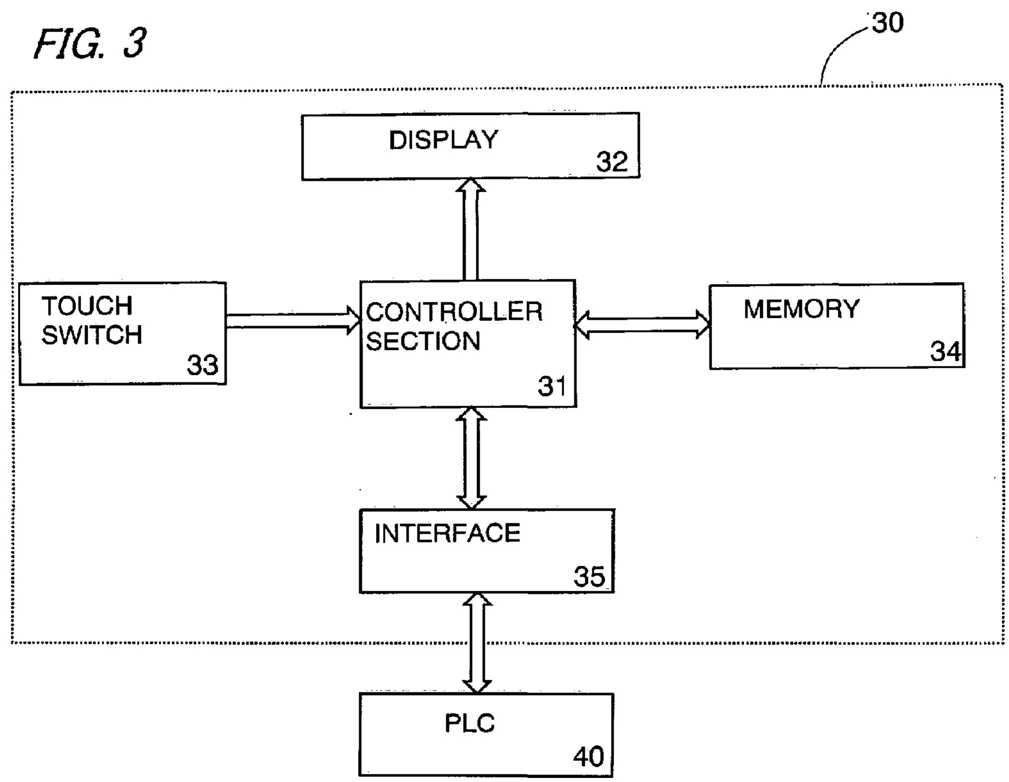
FIG. 3 is a schematic diagram showing a configuration of the touch screen unit.

As shown in FIG. 3, the touch screen unit 30 includes a controller section 31 including a CPU, a display 32, the touch switch 33, a memory 34, and an interface 35. The display 32 is in the form of a liquid crystal display (LCD) having a screen and including a driver for reproduction of the visual information as bitmapped image on the screen by the controller section 31. The touch switch 33 has an array of touch sensitive transparent areas covering the screen and each providing the switch output in response to being touched by the user. The memory 34 stores the visual information and the switch control code created by the image design tool 20. The interface 35 is provided for transmission of the visual information and the switch control data between the memory 34 and the image design tool 20 and also for transmission of control data between the controller section 31 and PLC 40.

Figure 4:
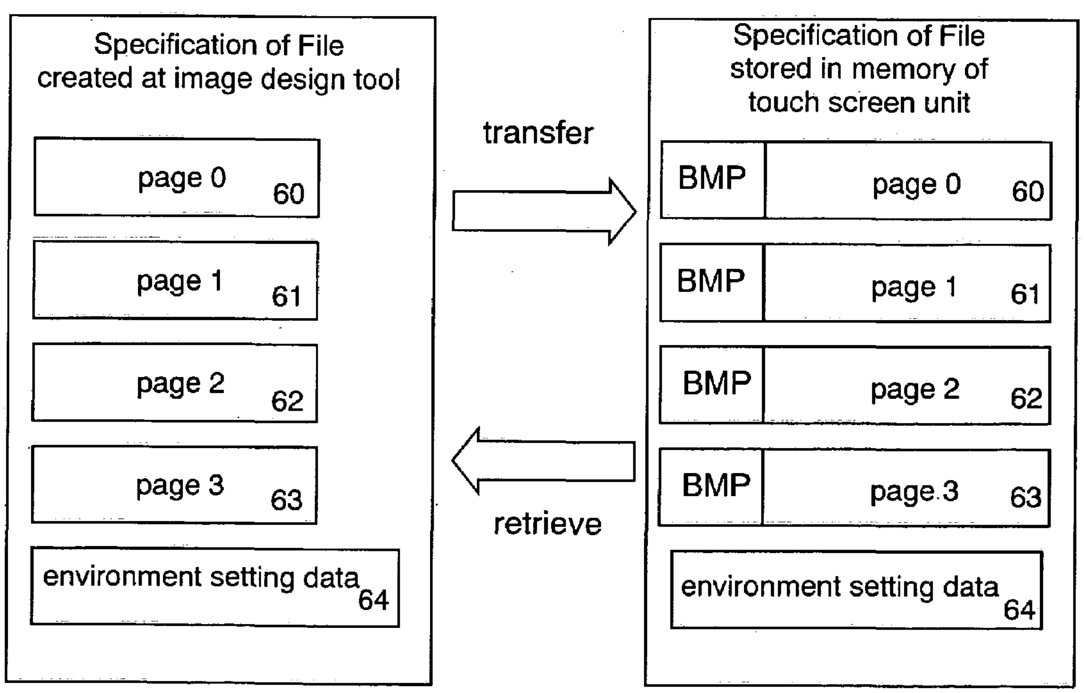
FIG. 4 is a view explaining the transfer of data between an image design tool and the touch screen unit.

The visual information created at the image design tool 20 is composed of base images B and rectangular switch frames SF overlayed on the base image. The base image is a background image appearing on each of the pages 60 to 63 and includes a string of characters and a graphic image such as a rectangular and a line. As shown in FIGS. 2A to 2D, the switch frames SF, which are provided at the pages 60 to 63 and illustrated with shadow lines, give user interface switches. In addition to drawing the switch frames, the image design tool has a function of determining switch actions of the switch frames. The switch actions includes, for example, switching of the pages on the display and designation the instruction to be transferred to PLC 40 for execution of particular routines of the program. In addition, the image design tool 20 sets an environment data 64 such as a screen size and a backlight screen color of the display 32. As shown in FIG. 4, the visual information (page 0, page 1, page 2, and page 3) including the switch control code for each page as well as the environment data 64 are created at the image design tool 20 for transfer to the memory 34 of the touch sensor unit 30. The visual information is created as a source display code which is to be translated into a corresponding bitmapped image for reproduction of the visual information on the display 32. Also, the switch control code is created as a source code which is translated at the controller section 31 into a suitable format to be executed thereat. Thus, each of pages 60 to 62 is defined by a combination of the source display code of the visual information and the source code of the switch control code.

Further, the image design tool 20 is programmed to have a conversion function of translating the source display code into the bitmapped image and exporting the bitmapped image as being attached to the source display code (page 0, page 1, page 2, and page 3) for each page, as shown in FIG. 4. The touch screen unit 30 operates to read the bitmapped image for immediate reproduction on the display 32 and to translate the switch control code for execution of the switch action. Also, the image design tool 20 is programmed to have a retrieve function of retrieving the source display code and the switch control code back from the memory 34 for modification of the visual information and the switch control code at the image design tool 20.

Figure 5A:
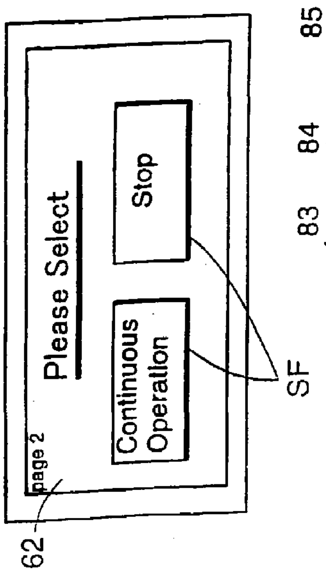
FIG. 5A illustrates one particular page which is designed to be displayed on the touch screen unit.
Figure 5B:
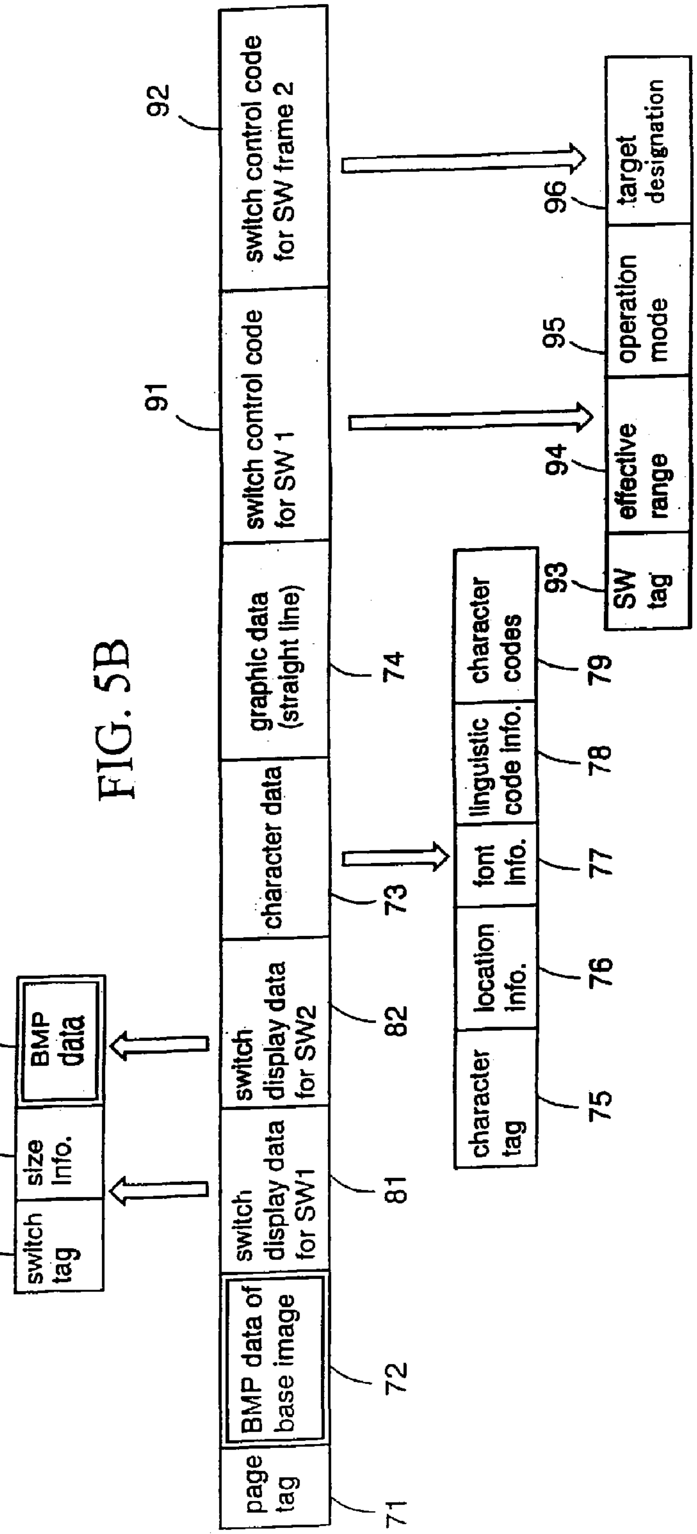
FIG. 5B is a view showing the content of data transferred from the image design tool to a memory of the touch screen unit.

Now more detailed explanation will be made as to the contents of the visual information with reference to FIGS. 5A and 5B. FIG. 5A shows the visual information of page 62, while FIG. 5B shows the contents of the visual information of page 62 and the associated switch control code. The page 62 includes the base image with the strings of characters "Please Select" and "page 2" and the graphic line, i.e., the underline below the string "Please Select", and two rectangular switch frames SF labeled as "Continuous Operation" and "Stop" and defining the first and second switches, respectively. Each rectangular switch frame SF includes a graphic image of rectangular and a string of characters "Continuous Operation" or "Stop", and has the switch control code embedded behind the rectangular frames. The characters for the base image as well as the switch frames are realized by vector fonts with the use of a font file equipped on the computer running the image design tool, while the graphic images for the base image as well as the switch frames are realized in vector-oriented format of the image design tool. The visual information thus including the characters and the graphic images for page 62 are translated at the image design tool 20 into the corresponding bitmapped image (BMP) which are appended to the source code of the visual information and the switch control code. That is, as shown in FIG. 5B, the data of page 62 is mainly composed of a page tag 71 specifying page 62, bitmapped image (BMP) 72 of the base image, switch display data 81 of the first switch, switch display data 82 of the second switch, character data 73 for the characters of the base image, graphic data 74 for the graphic image of the base image, switch control code 91 of the first switch, and switch control code 92 of the second switch.

Each of the switch display data 81 and 82 includes a switch tag 83 specifying the corresponding switch, size information 84 defining the size of the corresponding switch frame, and bitmapped image (BMP) 85 of the corresponding switch frame. The character data 73 includes a character tag 75 specifying the character information, locating information 76 designating locations of the characters, font information 77 for fonts utilized for the characters, linguistic code information 78 specifying a particular linguistic code or a character set utilized for the characters, and character codes 79 defined by the linguistic code to represent the characters utilized. In this connection, the image design tool 20 has a capability of selecting a particular linguistic code from a set of different linguistic codes so as to include the string of characters according to the selected linguistic code, and of including the selected linguistic code into the source display code. Whereby, when the source display code is retrieved from the memory 34 of the touch screen unit 30 to the image design tool 20, the string of the characters of the selected linguistic code can be successfully reproduced on the image design tool 20.

Each of the switch control code 91 and 92 includes a switch tag 93 specifying the switch control code, an effective range 94 in the display screen within which the switch is capable of being actuated, an operation mode 95 specifying the function of the switch, and a target designation 96 for specifying a target to be driven by the switch output. The function of the switch specified by the operation mode 95 includes making the switch as a monentarily actuated switch or alternately actuated bistable switch, for example, and also making the switch output as a command for changing the pages on the display 32. When the operation mode 95 is set to make the switch output as the command for changing the pages, the target designation 96 specifies the page of the visual information. Otherwise, the target designation 96 specifies the device 50 to be controlled by PLC 40.

Figures 6A, 6B, 6C, 6D:
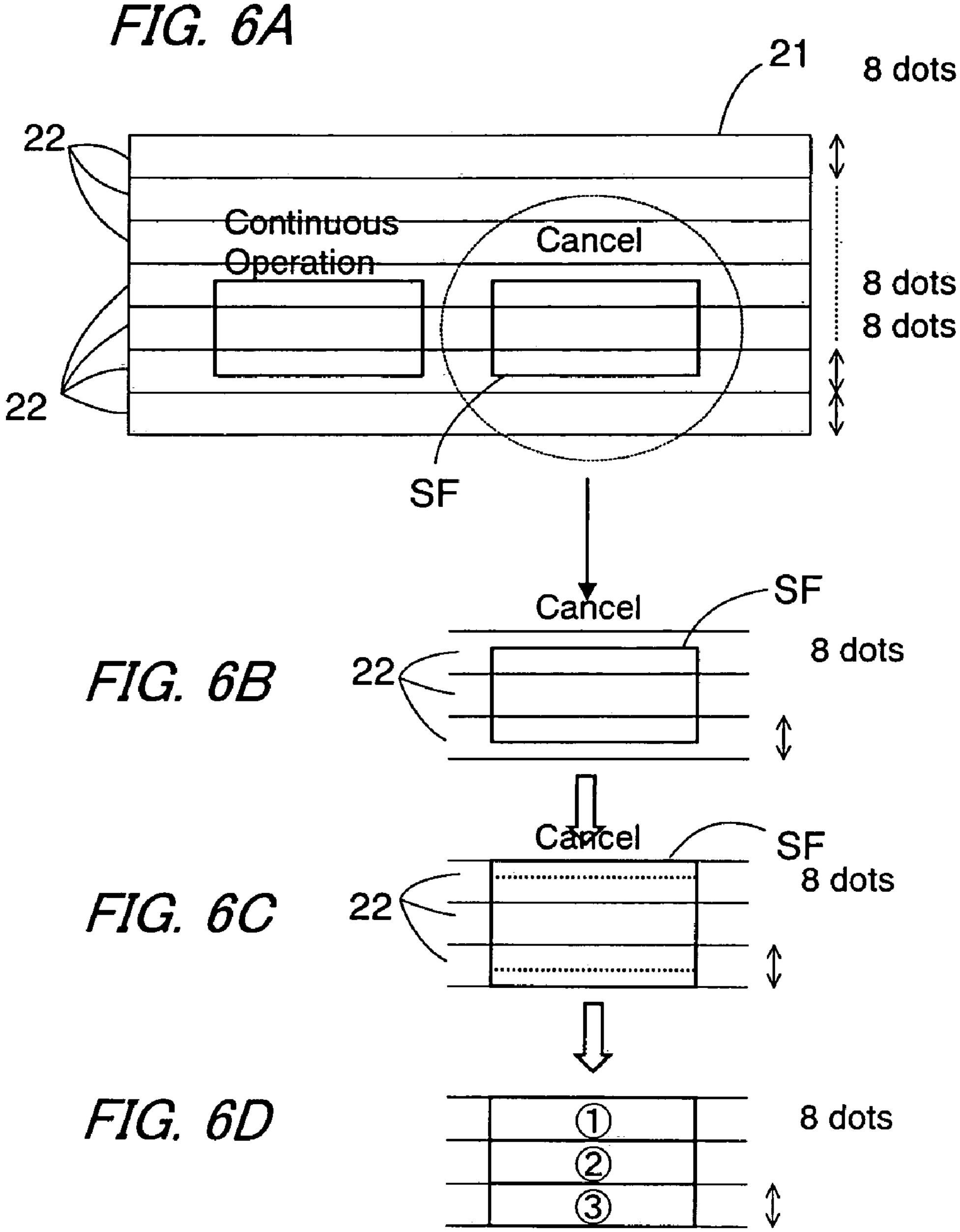
FIG. 6A is a view showing rectangular switch frames included in an image created at the image design tool.
FIGS. 6B to 6D show a scheme of resizing the rectangular switch frame in the image for easy handling at the touch screen unit.

Referring to FIGS. 6A to 6E, the present invention employs a unique scheme of resizing the bitmapped image for the rectangular switch frame into a suitable format and transferring the resized bitmapped image to the memory 34 of the touch screen unit 30 so that the controller section 31 can reproduce the bitmapped image on the display 32 at a high speed. When the visual information includes the rectangular switch frames SF as shown in FIG. 6A, the image design tool 20 analyzes the size of the bitmapped image for the rectangular frame SF and resize the switch frame SF when transferring the bitmapped image to the touch screen unit 30. The image design tool 20 provides a screen area 21 for drawing the visual information therein. The screen area 21 is divided into a plurality of elongated unit zones or bands 22 each having a unit width of eight (8) dots, as shown in FIG. 6A. When, for example, the switch frame SF labeled "Cancel" is made to have a width not corresponding to an integer multiple of the unit width, i.e., have the upper and lower sides of rectangular switch frame SF disposed between the borders of the bands 22, as shown in FIG. 6B, the image design tool 20 adds extra blank spaces in the rectangular switch frame SF to such an extent that the upper and lower sides of the rectangular frame are in registration with the borders of the bands 22. Thus, the rectangular switch frame SF is resized to have a width which is an integer multiple of the unit width, as indicated by the solid lines in FIG. 6C. The resized rectangular switch frame SF is divided into segments ①, ②, and ③ each having the unit width, as shown in FIG. 6D. Then, the resized rectangular switch frame SF is transferred in the form of the divided segments to the memory 34 of the touch screen unit 30. In this manner, since the rectangular switch frame is resized so as to be divided into the segments of unit width, the controller section 31 of the touch screen unit 30 is capable of expanding the switch frame from the memory segment by segment and therefore assuring a high speed reproduction of the switch frame on the display 32 of the touch screen unit 30.

The memory 34 is configured to have a basic memory area storing all the data transmitted from the image design tool 20, and have additional areas, namely, the virtual image area and an actual image area. The virtual image area has a size greater than a screen size of the display 32, while the actual image area has a size equal to the screen size of the display 32. In this connection, the screen area available at the image design tool 20 for drawing the visual information is made to have a size slightly greater than the screen size of the display 32 for giving design flexibility. The bitmapped image stored in the basic memory area is loaded to the virtual image area to give a virtual image of the bitmapped image. The virtual image is then loaded into the actual image area where it is trimmed into an actual image fitted in the screen size. Thereafter, the controller section 31 transfers the actual image to the display 32 for reproduction of the actual image thereat. In this manner, only the image within the screen size can be simply transferred from the memory without resorting to laborious procedure of checking over-reached portion of the image and making proportional resizing of the entire image, thereby enabling immediate reproduction of the visual information on the display only at an expense of canceling the over-reached portion around the virtual image.

What is claimed is:

1. A system for designing visual information reproduced on a monitor unit utilized in combination with a programmable logic controller (PLC), said system comprising:

an image design tool operating on a personal computer equipped with a first display; and said monitor unit connected to said PLC which executes a program for controlling an operation of a device coupled to said PLC, said monitor unit including a second display which is different from said first display, a memory, and a control section for controlling the operation of said monitor unit;

said second display giving thereon task information to be performed by the device managed by the PLC, and including a touch screen for entry of a specific instruction to be carried out by the PLC for control of said device, said image design tool creating a source display code for displaying said visual information on said second display, said image design tool being provided with a conversion means for translating said source display code into a corresponding bitmapped image and exporting said bitmapped image to said memory of said monitor unit for immediate reproduction of said visual information on said second display, said image design tool having means for drawing, on said first display, a plurality of rectangular frames to be included in said visual information, each rectangular frame being written in said source display code which is translated by said conversion means into said bitmapped image which is exported to said memory in said monitor unit.

2. The system as set forth in claim 1, wherein said monitor unit includes the touch screen switch on said display for generating a switch output to said PLC in response to a user's action of touching a particular area on said display, said image design tool having a means of creating a switch control code for defining said switch output, and a transfer means of transferring said switch control code to the memory of said monitor unit, and said control section of said monitor unit processing said switch control code stored in said memory in order to associate said switch output to a particular function of said PLC for control of said device connected to said PLC.

3. The system as set forth in claim 2, wherein said transfer means feeds said source display code to the memory of said touch screen unit, said image design tool further including a retrieve means for retrieving said source display code and said switch control code back from said memory for modification of said visual information and said switch control code at said image design tool, said image design tool transferring, to said memory, the source display code and the bitmapped image with regard to individual visual information to be displayed on plural pages of said second display, and said retrieving means retrieving, from the memory, the source display code and the switch control code with regard to each of said pages.

4. The system as set forth in claim 1, wherein said image design tool has a screen area for drawing said visual information therein, said screen area being divided into a plurality of unit zones extending in parallel with each other and having a length and a unit width defined by a fixed number of dots, said image design tool having a means of drawing a rectangular frame to be included in said visual information, said rectangular frame being written in said source display code which is translated by said conversion means into a corresponding bitmapped image for reproduction on said second display, said image design tool having a reshaping means of resizing the bitmapped image of said rectangular frame into a modified rectangular frame having a width equal to an integer multiple of said unit width, dividing said modified rectangular frame into one or more segments each having the unit width, and transferring said one or more segments to the memory of said monitor unit so as to be recombined on said second display to reproduce said modified rectangular frame.

5. The system as set forth in claim 2, wherein said image design tool has a screen area for drawing said visual information therein, said screen area being divided into a plurality of unit zones extending in parallel with each other and having a length and a unit width defined by a fixed number of dots, said image design tool having a means of drawing a rectangular frame to be included in said visual information and of defining said rectangular frame as corresponding to a touch sensitive part said touch screen switch, said rectangular frame being written in said source display code which is translated by said conversion means into a corresponding bitmapped image for reproduction on said second display, said image design tool having a reshaping means of resizing the bitmapped image of said rectangular frame into a modified rectangular frame having a width equal to an integer multiple of said unit width, dividing said modified rectangular frame into one or more segments having the unit width, and transferring said one or more segments to the memory of said monitor unit so as to be recombined on said second display to reproduce said modified rectangular frame.

6. The system as set forth in claim 1, wherein said image design tool has capability of selecting a particular linguistic code from a set of different linguistic codes so as to create said visual information by using a string of characters according to the selected linguistic code, and of including an identifier of identifying the selected linguistic code into said source display code such that, when the source display code is retrieved from the memory of said monitor unit to said image design tool, the string of the characters of the selected linguistic code is reproduced on said image design tool.

7. The system as set forth in claim 1, wherein the memory of said monitor unit comprises:

a virtual image area which has a size greater than a screen size given to said second display and in which said bitmapped image is loaded to give a virtual image of said bitmapped image, and an actual image area which has a size equal to the screen size of said second display and which trims said virtual image from said virtual image area into an actual image fitted in the screen size and stores said actual image;

said controller section of the monitor unit executing to transfer said actual image from said actual image area to said second display.

* * * * *